Oct. 22, 1968  A. J. JONES  3,406,988
JOINT
Filed June 14, 1966
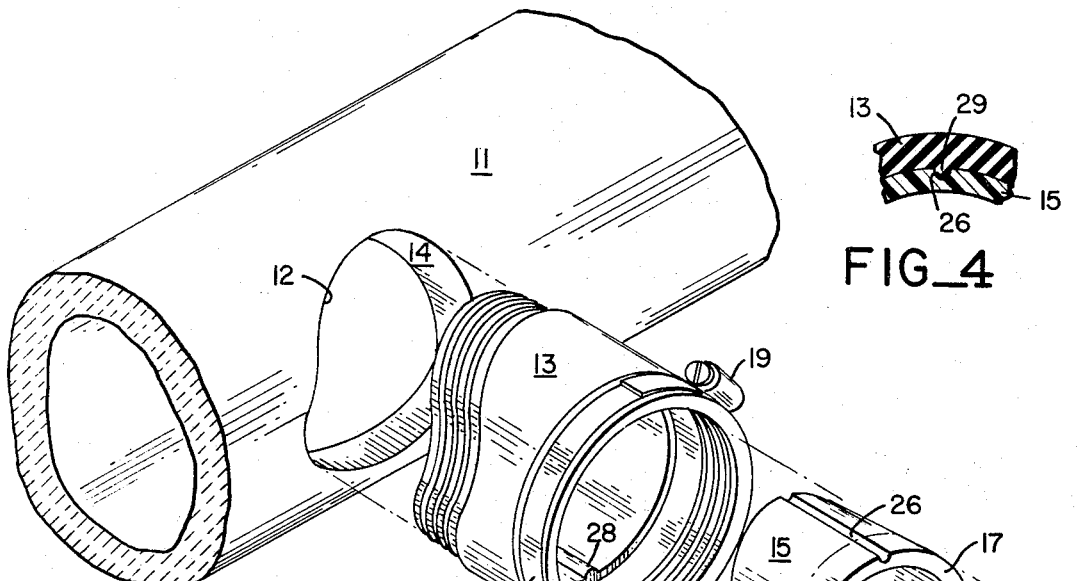
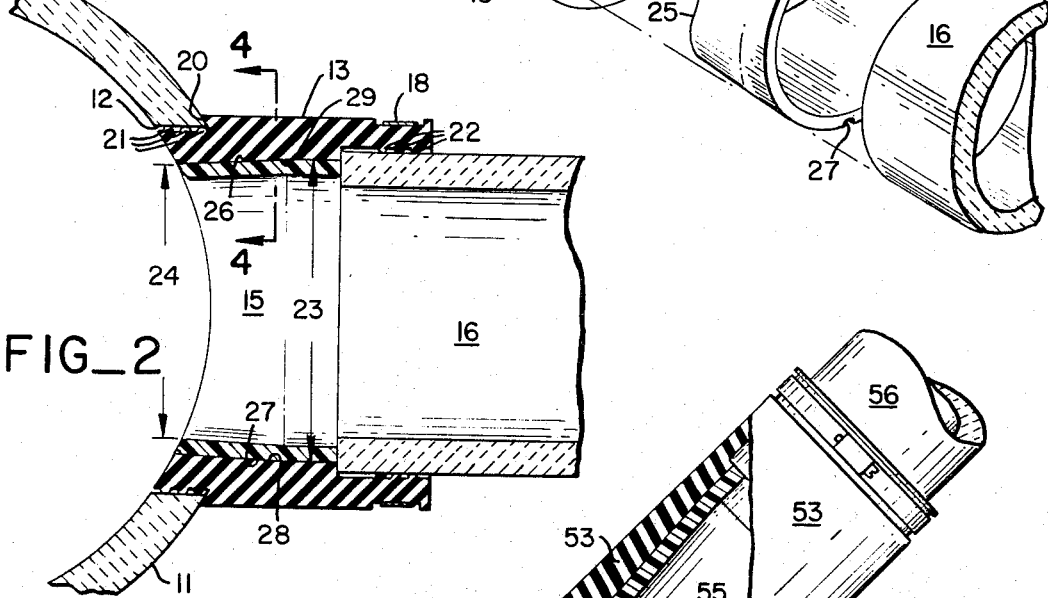
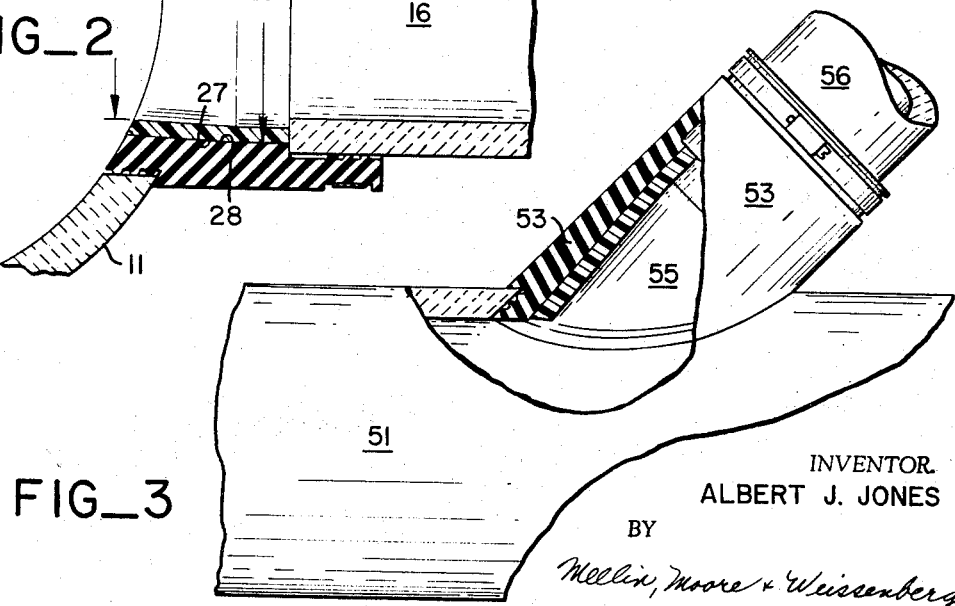
INVENTOR.
ALBERT J. JONES
BY
Mellin, Moore & Weissenberger
ATTORNEYS 
United States Patent Office 3,406,988
Patented Oct. 22, 1968

3,406,988
JOINT
Albert J. Jones, 9105 Golf Links Road,
Oakland, Calif. 94605
Filed June 14, 1966, Ser. No. 557,417
4 Claims. (Cl. 285—24)

ABSTRACT OF THE DISCLOSURE

Settlement problems in connecting a lateral to a sewer pipe or the like are avoided by using an elastic sleeve with a shoulder which, when it lies against the outside of the main, causes the inner end of the sleeve to lie flush with the inside of the main; inserting a cylindrical wedge into the sleeve to sealingly expand the sleeve; abutting the end of the lateral against the wedge to hold it in place, and securing the sleeve tightly about the lateral. Alignment means are provided between the sleeve and wedge.

Background of the invention

This invention relates to a joint characterized by a sleeve with a tubular wedge inserted therein. The joint is particularly, though not exclusively, useful in connecting a sewer lateral to the main service line.

In that environment, the invention provides a highly economical, convenient and reliable invention not provided by the prior art. The customary means of connecting a sewer lateral to the main line relies on a number of fitting configurations having cement or epoxy resin covering their interface. In each case, a great deal of time and effort must be expended to envelop or cover the joint with the cement or resin to make it reasonably sound or leakproof. Moreover, with both cement and resin a setting or cure time is necessary, and in the case of the resin, additional apparatus is required in the form of heatlamps. In addition to requiring a good deal of time and effort, the joints of the prior art are generally rigid and crack rather than deform with settling or shifting.

Summary of the invention

The present invention provides an elastic sleeve, one end of which can be inserted into the hole formed in the side of the main for connection purposes. The sleeve has a shoulder around its outside and is so shaped that when the shoulder lies against the outside of the main, the inner end of the sleeve is flush with the inside of the main. A rigid wedge member is then inserted into the sleeve and is aligned therewith by appropriate means so that it, also, will be flush with the inside of the main when it is fully inserted.

Insertion of the wedge causes the inner end of the sleeve to expand into watertight contact with the walls of the hole. The lateral is then inserted into the outer end of the sleeve until it abuts the outer end of the wedge to prevent the wedge from working itself out of the hole.

Finally, the outer end of the sleeve is tightly compressed about the lateral, as by a metal band, to make a watertight seal. The result is a flexible joint which can accommodate considerable settling of the lateral. At the same time, the wedge action and the fact that the lateral cannot move axially once it is installed cooperate to maintain a tight seal between the main and the sleeve.

Accordingly, it is an object of the present invention to provide means of connecting two tubular conduits to provide a leakproof joint with a minimum of time and effort.

It is a further object to provide a joint between two tubular conduits which does not require any packing or covering material.

It is a further object to provide a joint between two tubular conduits which requires no curing or setting.

It is a further object to provide a joint which may be deformed within limits without cracking or opening the joint.

Brief description of the drawing

FIG. 1 is an exploded perspective view of the invention and shows the main line, the elastic sleeve, the tubular wedge, and the lateral line;

FIG. 2 is a vertical sectional view taken on the axis of the elastic sleeve, tubular wedge, and lateral line with the elements in joined relationship; and FIG. 3 is a fragmentary top view and includes a partial sectional view showing a variation in the form of the invention for use on a 45° lateral; and FIG. 4 is a sectional view taken on the line 4—4 of FIG. 2.

Description of the preferred embodiments

With reference to FIG. 1, the invention comprises a first tubular conduit or service line 11 which defines a circular opening 12 having an axis transverse to the longitudinal axis of service line 11. An elastic sleeve 13 is insertable into opening 12 to engage the inside surface 14 of said opening. A tubular wedge 15 is insertable into sleeve 13 and, when driven into place, projects into opening 12 to thereby compress sleeve 13 into engagement with the edge 14 of said opening. A second tubular conduit or lateral line 16 is insertable into sleeve 13 and, when in place, abuts the exterior edge 17 of tubular wedge 15. A circumferentially disposed metal strap 18 with tightening means 19 serves as a means for securing lateral line 16 in engagement with sleeve 13 when inserted therein.

With reference to FIGS. 1 and 2, sleeve 13 is formed with a shoulder 20 which is spaced from the end of sleeve 13 a distance equal to the wall thickness of opening 12. The portion of sleeve 13 which extends a length equal to the wall thickness of opening 12, is preferably, though not necessarily, provided with a series of circumferentially extending ridges or corrugations 21. Corrugations 21 provide a tight joint between sleeve 13 and surface 14 of opening 12 when they are forced outwardly or compressed against surface 14 through the action of tubular wedge 15.

A series of circumferential ridges or corrugations 22 is provided on the end of sleeve 13 opposite corrugations 21 to engage lateral line 16. Ridges 22 provide a tight joint between sleeve 13 and lateral line 16 when they are compressed into engagement therewith by means of tightening strap 18.

Tubular wedge 15 is provided with a major diameter 23 and a minor diameter 24, both of which are chosen to provide a wedging action against sleeve 13 when tubular wedge 5 is driven into place as shown in FIG. 2.

It may be readily understood with reference to FIG. 1 that sleeve 13 and tubular wedge 15 must be properly oriented with respect to rotation about their respective axis due to the three-dimensional characteristic of opening 12. In other words, the "saddle shaped" configuration of opening 12 requires an orientation of sleeve 13 and the interior edge 25 of tubular wedge 15 during assembly. That orientation is provided by means of grooves 26 and 27 which extend longitudinally on the outside surface of tubular wedge 15. A pair of corresponding ridges or rails 28 and 29 extends longitudinally on the inside surface of sleeve 13. Ridges 28 and 29 are positioned to mate with grooves 26 and 27 when tubular wedge 15 is properly positioned relative to rotation about its longitudinal axis. Thus, as shown in FIG. 4, when tubular wedge 15 is properly oriented with respect to sleeve 13, such that the "saddle shaped" edge 25 of tubular wedge 15 is positioned to correspond with the "saddle shaped" edge of sleeve 13, rail 29 mates with groove 26 and rail 28 mates with groove 22. When so mated, tubular wedge 15 can be driven into place as shown in FIG. 2.

Sleeve 13 is preferably formed by an elastic material such as rubber. Tubular wedge 15 must be formed of a rigid material and both cast iron and plastic have been found to be suitable.

The present invention is assembled by first inserting the "saddle shaped" end of sleeve 13 into opening 12. Sleeve 13 must be oriented with respect to rotation about its longitudinal axis so that shoulder 20 is in uniform contact with main line 11. Tubular wedge 15 is then rotated to align grooves 26 and 27 with ridges 28 and 29 and driven into place. When in place, tubular wedge 15 forces sleeve 13 outwardly and causes a tight engagement between circumferentially extending ridges 21 and surface 14 of opening 12. Lateral line 16 is then inserted into sleeve 13 until it abuts edge 17 of tubular wedge 15. Metal strap 18 is then tightened by means of mechanism 19 and circumferentially extending ridges 22 are tightly compressed against the outside surface of lateral 16. The joint is thus formed.

With reference to FIG. 3, an embodiment is shown with a sleeve 53 and a tubular wedge 55 adapted for the formulation of a 45° joint between main or service line 51 and lateral line 56. In all essential respects the joint shown in FIG. 3 is identical to the joint of FIGS. 1 and 2, the only difference being the 45° end configuration of sleeve 53 and tubular wedge 55.

While the joint has been described in the context of a transverse connection, i.e., with the axis of lateral line 16 positioned transversely to the axis of main line 11, it can be used to form a longitudinal joint. In other words the components can be used to form a longitudinal joint, i.e., a joint in which the axis of the second conduit is coincidental with the axis of the first conduit. Such a connection is within the scope of the present invention.

I claim:
1. A joint comprising:
   (a) a first tubular conduit having a circular opening in a side wall thereof;
   (b) an elastic sleeve inserted into said opening in engagement with the edge thereof and flush with the inner surface of said first tubular conduit throughout the perimeter of said sleeve;
   (c) a tubular wedge tapering inwardly in the direction of said first tubular conduit, said wedge being inserted in said sleeve flush with the inner surface of said first tubular conduit throughout the perimeter of said wedge, projecting into said opening and compressing said sleeve into sealing engagement with said edge of said opening;
   (d) a second tubular conduit inserted into said sleeve, abutting said wedge and spaced from said opening; and
   (e) means for securing said tubular conduit in engagement with said sleeve;
   (f) whereby said abutting relationship and wedge shape cooperate to hold said wedge in flush position with the inner surface of said first tubular conduit.

2. The joint of claim 1 and corrugated means on said sleeve for engagement with said edge of said opening.

3. The joint of claim 1 and guide means for aligning said tubular wedge with relation to said sleeve in such a manner that said tubular wedge will lie flush with the inner surface of said first tubular conduit throughout the perimeter of said wedge when said elastic sleeve is so positioned.

4. The joint of claim 3 wherein said means for aligning said tubular wedge with said sleeve consists of a groove on the exterior surface of said wedge extending longitudinally thereof, and a corresponding ridge on the inside surface of said sleeve extending longitudinally thereof.

References Cited
UNITED STATES PATENTS

| 1,726,809 | 9/1929 | Cox | 285—323 |
| 1,821,328 | 9/1931 | Segelhorst | 285—175 |
| 3,222,093 | 12/1965 | Simmons | 285—162 |

FOREIGN PATENTS

| 30,022 | 12/1911 | Great Britain. |
| 311,032 | 5/1929 | Great Britain. |
| 876,030 | 8/1961 | Great Britain. |

CARL W. TOMLIN, *Primary Examiner.*

DAVE W. AROLA, *Assistant Examiner.*